US012650896B2

(12) United States Patent
Song et al.

(10) Patent No.: US 12,650,896 B2
(45) Date of Patent: Jun. 9, 2026

(54) MEMORY DEVICE AND A METHOD OF OPERATING THE SAME DEVICE

(71) Applicant: SAMSUNG ELECTRONICS CO., LTD., Suwon-si (KR)

(72) Inventors: Yujung Song, Suwon-si (KR); Sung-Rae Kim, Suwon-si (KR); Hye-Ran Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/764,870

(22) Filed: Jul. 5, 2024

(65) Prior Publication Data

US 2025/0123920 A1     Apr. 17, 2025

(30) Foreign Application Priority Data

Oct. 13, 2023     (KR) ........................ 10-2023-0136895

(51) Int. Cl.
*G06F 11/10*          (2006.01)
(52) U.S. Cl.
CPC ........ *G06F 11/1044* (2013.01); *G06F 11/106* (2013.01)
(58) Field of Classification Search
CPC .............. G06F 11/1044; G06F 11/106; G06F 11/1048; G11C 29/42; G11C 11/408; G11C 29/025
See application file for complete search history.

(56) References Cited

U.S. PATENT DOCUMENTS

| | | | |
|---|---|---|---|
| 10,037,244 B2 | 7/2018 | Chung et al. | |
| 10,810,079 B2 | 10/2020 | Halbert et al. | |
| 10,817,371 B2 | 10/2020 | Rooney et al. | |
| 11,145,351 B2 | 10/2021 | Lim et al. | |
| 11,579,971 B2 | 2/2023 | Ayyapureddi | |
| 11,604,693 B2 | 3/2023 | Ryu et al. | |
| 11,664,084 B2 | 5/2023 | Veches et al. | |
| 2019/0019569 A1 | 1/2019 | Pope | |
| 2021/0124644 A1* | 4/2021 | Saxena ............... | G06F 11/1048 |
| 2021/0142860 A1* | 5/2021 | Song ...................... | G11C 29/44 |
| 2022/0197739 A1* | 6/2022 | Ryu ...................... | G06F 11/106 |
| 2024/0079076 A1* | 3/2024 | Moon ..................... | G11C 29/14 |

FOREIGN PATENT DOCUMENTS

| | | |
|---|---|---|
| KR | 10-2022-0090794 | 6/2022 |

* cited by examiner

*Primary Examiner* — Thien Nguyen
(74) *Attorney, Agent, or Firm* — Fish & Richardson P.C.

(57)          ABSTRACT

A memory device and a method of operating the memory device are provided. The memory device includes a memory cell array including a plurality of memory cells to store data, an error correction code (ECC) circuit, and an error check and scrub (ECS) circuit. The ECC circuit reads the data from the memory cell array and corrects errors in the data. The ECS circuit performs a scrubbing operation on the memory cell array and transmits a signal for an error address detected based on the scrubbing operation to an external circuit and stores the error address which was transmitted.

17 Claims, 21 Drawing Sheets

| | ROW ADDRESS | CE_COUNT | UE/Non-UE |
|---|---|---|---|
| Pre_ERA | RAy | Cy | Non-UE |

FIG. 8

ERA_TABL

| INDEX | ERROR ROW ADDRESS |
|-------|-------------------|
| 1 | RAb |
| 2 | RAd |
| ⋮ | ⋮ |
| n-3 | RAz |
| n-2 | |
| n-1 | |
| n | |

| | ROW ADDRESS | CE_COUNT | UE/Non-UE |
|---|---|---|---|
| Pre_ERA | RAy | Cy(Cmax) | Non-UE |

FIG. 13

ERA_TABL

| INDEX | ERROR ROW ADDRESS |
|-------|-------------------|
| 1 | RAb |
| 2 | RAd |
| ⋮ | ⋮ |
| n-3 | RAz |
| n-2 | RAy |
| n-1 | |
| n | |

| | ROW ADDRESS | CE_COUNT | UE/Non-UE |
|---|---|---|---|
| Pre_ERA~ | RAa | Ca | Non-UE |

FIG. 17

ERA_TABL

| INDEX | ERROR ROW ADDRESS |
|-------|-------------------|
| 1 | RAb |
| 2 | RAd |
| ⋮ | ⋮ |
| n-3 | RAz |
| n-2 | RAa |
| n-1 | |
| n | |

MEMORY DEVICE AND A METHOD OF OPERATING THE SAME DEVICE

CROSS-REFERENCE TO RELATED APPLICATION

This application claims priority to and the benefit of Korean Patent Application No. 10-2023-0136895 filed in the Korean Intellectual Property Office on Oct. 13, 2023, the entire contents of which are incorporated herein by reference.

BACKGROUND

In general, as a memory device, a dynamic random access memory (DRAM) has volatile data characteristics, so even in the case of normal cells, the validity of data cannot be guaranteed after a certain period of time.

In addition, as DRAM cells gradually become smaller, the probability of single bit or more errors occurring in memory devices and being uncorrectable by error correction code (ECC) circuits, or the occurrence of physical errors (for example, hard fail) is increasing.

In the field of memory devices, there is a growing need for efficient management of error addresses where error correction is not possible or where physical errors occur.

SUMMARY

The present disclosure relates to a memory device and a method of operating the same.

For example, in some implementations, the present disclosure is directed to a memory device that enables a memory controller to effectively perform page management.

In some implementations, the present disclosure is directed to a memory device that independently manages error addresses to be excluded from an error check and scrub (ECS) mode.

In some implementations, the present disclosure is directed to a memory device with improved efficiency of a repair operation.

In some implementations, the present disclosure is directed to a memory device, including: a memory cell array including a plurality of memory cells configured to store data; an error correction code (ECC) circuit configured to read the data from the memory cell array and configured to correct errors in the data, and an ECS circuit configured to perform a scrubbing operation on the memory cell array in error check and scrub (ECS) mode, configured to transmit a signal for an error address detected based on the scrubbing operation to an outside circuit, and store the error address transmitted to the outside circuit.

In some implementations, the present disclosure is directed to a method of operating a memory device, including: generating an error address table for a row address, based on a first report command for the row address of a memory cell array; performing a scrubbing operation in ECS mode on a first row address among the row addresses comparing the first row address with the error address table, and logging the first row address according to a result of comparing the first row address.

In some implementations, the present disclosure is directed to a memory device, including: a memory cell array including a plurality of memory cells disposed at intersections of a plurality of word lines and a plurality of bit lines, an ECC circuit configured to read data from the memory cell array and correct errors in the data; and an ECS circuit configured to perform a scrubbing operation on the memory cell array in ECS mode and transmit a signal for an error address detected based on the scrubbing operation to the outside circuit, and a row decoder including a repair unit configured to perform a repair operation on the plurality of word lines based on the error address transmitted to the outside circuit.

BRIEF DESCRIPTION OF THE DRAWINGS

FIG. 7 is a diagram for describing an ECS register of FIG. 6.

FIG. 8 is a diagram for describing an ERA register of FIG. 6.

FIGS. 11 to 13 are diagrams for describing an example method of operating a memory system.

FIGS. 15 to 17 are diagrams for describing an example method of operating a memory system.

FIG. 18 is a block diagram illustrating configuration of an example memory device.

FIG. 21 is a diagram for describing a computing system to which an example memory system is applied.

DETAILED DESCRIPTION

Figure 1:
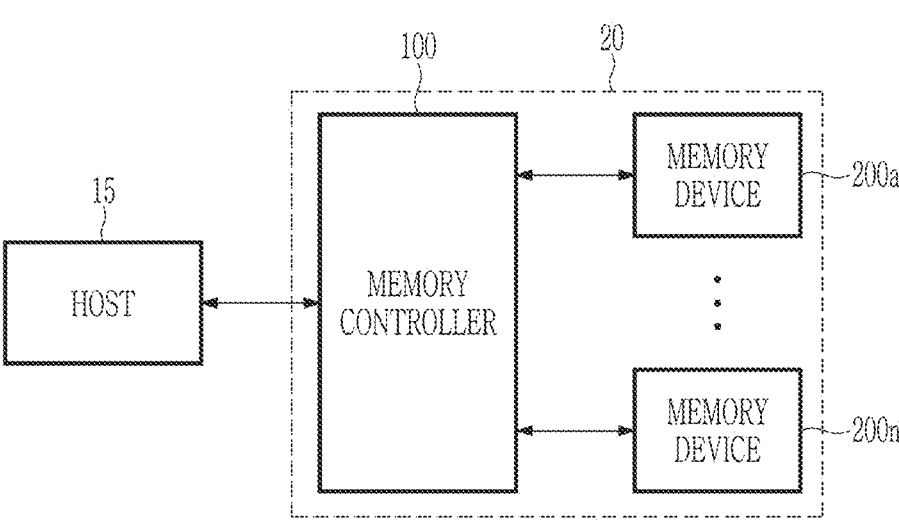
FIG. 1 is a block diagram illustrating an example electronic system.

Hereinafter, the present disclosure will be described in detail hereinafter with reference to the accompanying drawings, in which implementations of the present disclosure are shown. As those skilled in the art would realize, the described implementations may be modified in various different ways, all without departing from the spirit or scope of the present disclosure.

The drawings and description are to be regarded as illustrative in nature and not restrictive. Like reference numerals designate like elements throughout the specification.

Size and thickness of each constituent element in the drawings are arbitrarily illustrated for better understanding and ease of description, the following implementations are not limited thereto. In the drawings, the thickness of layers, films, panels, regions, etc., are exaggerated for clarity. In the drawings, the thickness of some layers and regions may be exaggerated for ease of description.

In addition, unless explicitly described to the contrary, the word "comprise", and variations such as "comprises" or "comprising", will be understood to imply the inclusion of stated elements but not the exclusion of any other elements.

FIG. 1 is a block diagram illustrating an example electronic system.

Referring to FIG. 1, an electronic system (or electronic device) 10 may include a host 15 and a memory system 20. The memory system 20 may include a memory controller 100 and a plurality of memory devices 200a to 200n.

The host 15 may communicate with the memory system 20 using an interface protocol, such as peripheral component interconnect-express (PCI-E), advanced technology attachment (ATA), serial ATA (SATA), parallel ATA (PATA), or serial attached SCSI (SAS). Additionally, the interface protocol between the host 15 and the memory system 20 is not limited to the above examples and may be one of other interface protocols such as a universal serial bus (USB), a multimedia card (MMC), an enhanced small disk interface (ESDI), or integrated drive electronics (IDE), etc.

The memory controller 100 controls the overall operation of the memory system 20 and controls the overall data exchange between the host 15 and the plurality of memory devices 200a to 200n. For example, the memory controller 100 may control the plurality of memory devices 200a to 200n to write or read data at the request of the host 15.

The memory controller 100 also controls operations of the plurality of memory devices 200a to 200n by providing commands for controlling the plurality of memory devices 200a to 200n.

Depending on the implementation, the plurality of memory devices 200a to 200n may be dynamic random access memory (DRAM) having dynamic memory cells. In some implementations, each of the plurality of memory devices 200a to 200n may be a memory device including resistive type memory cells such as a phase change random access memory (PRAM), a resistive random access memory (RRAM), a magnetic random access memory (MRAM), and a ferroelectric random access memory (FRAM).

Figure 2:
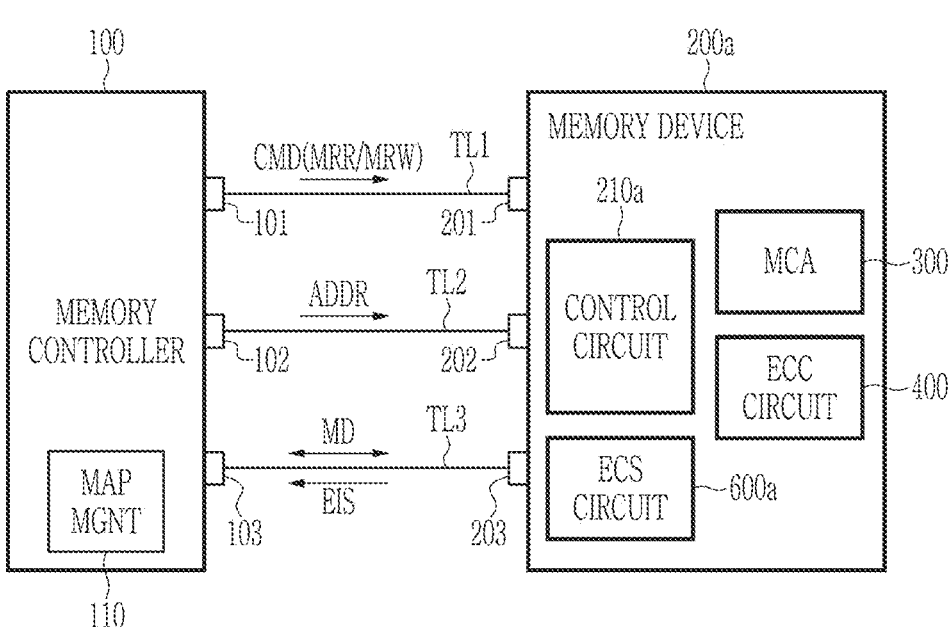
FIG. 2 is a block diagram illustrating an example memory system.

FIG. 2 is a block diagram illustrating an example memory system. Hereinafter, in FIG. 2, a memory device 200a corresponding to the memory controller 100 will be described as an example.

Referring to FIGS. 1 and 2, the memory system 20 may include the memory controller 100 and the memory device 200a. The memory controller 100 and the memory device 200a may be connected to each other through corresponding command pins 101 and 201, address pins 102 and 202, and data pins 103 and 203, respectively.

The command pins 101 and 201 may transmit a command CMD through a command transmission line TL1, and the address pins 102 and 202 may transmit an address ADDR through an address transmission line TL2.

The data pins 103 and 203 may exchange a main data MD through a data transmission line TL3 in normal mode. A data pin 203 of the memory device 200a may transmit an error information signal EIS to the data pin 103 of the memory controller 100 through the data transmission line TL3 in ECS mode. Depending on the implementation, when the command CMD of the memory controller 100 corresponds to a report about an error row address, the memory device 200a may receive the error information signal EIS about the error row address through the data pins 103 and 203. The command for the report may be, for example, a mode register read (MRR) command that reads mode information in a register but is not limited thereto.

The memory controller 100 may include a map management device 110. The map management device 110 may be implemented to manage a map table that maps logical addresses and corresponding physical addresses of the memory device 200. In particular, the map management device 110 may use the error information signal (EIS) received from the memory device 200 to page offline the corresponding error row address or to provide the command CMD to the memory device 200 for a repair operation, such as a PPR (post package repair), soft PPR, hard PPR, and the like. The command for the repair operation may be, for example, a mode register write (MRW) command that writes mode information to a register but is not limited thereto.

The memory device 200a may include a memory cell array 300 in which the main data MD is stored, an error correction code (ECC) circuit 400, an error check and scrub (ECS) circuit 600a, and a control circuit 210a that controls the ECS circuit 600a.

When the command CMD provided from the memory controller 100 indicates the ECS mode, the ECS circuit 600a may perform ECC decoding on data in a subpage at an address indicated by the address signal ADDR, either sequentially or in a predetermined scheduled method. The ECS circuit 600a may control the ECC circuit 400 to generate a flag signal according to ECC decoding. The flag signal may include information on whether an error is detected and whether the error is corrected but may vary depending on the implementation.

Depending on the implementation, the ECS circuit 600a may log error information generated based on the flag signal and a candidate error row address for the error information. When the command CMD provided from the memory controller 100 is a report on an error row address, the memory device 200a may transmit the row address logged in the ECS circuit 600a to the memory controller 100 as an error row address.

Depending on the implementation, the row address transmitted to the memory controller 100 may be stored as an error row address in the ECS circuit 600a. The stored error row address may be compared before logging the row address. The memory device 200a may prevent the error row address transmitted through the comparison operation from being transmitted again to the memory controller 100 through the ECS circuit 600a. Through the operation of the above-described ECS circuit 600a, the memory controller 100 may effectively perform page management.

Figure 3:
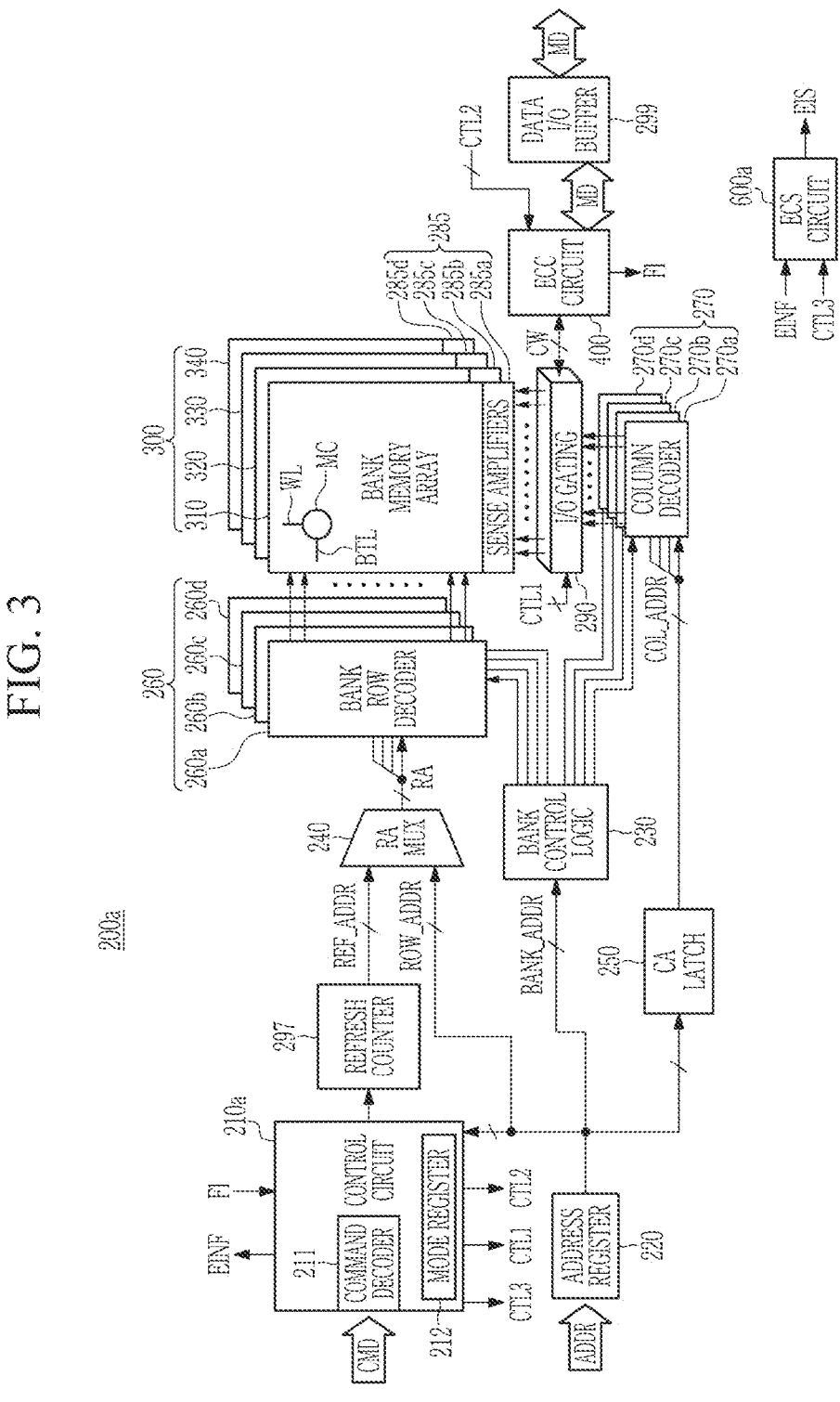
FIG. 3 is a block diagram illustrating configuration of an example memory device.

FIG. 3 is a block diagram illustrating configuration of a memory device.

Referring to FIGS. 2 and 3, the memory device 200a may include a control circuit 210a, an address register 220, a bank control logic 230, a refresh counter 297, a row address multiplexer 240, a column address latch 250, a row decoder 260, a column decoder 270, a memory cell array 300, a sense amplifier 285, an input/output gating circuit 290, a data input/output buffer 299, an ECC circuit 400, and the ECS circuit 600a.

The memory cell array 300 may include first to fourth bank arrays 310 to 340. Each of the first to fourth bank arrays 310 to 340 may include a plurality of word lines WL, a plurality of bit lines BTL, and a plurality of memory cells MC disposed where the plurality of word lines WL and the bit lines BTL intersect.

Figure 5:
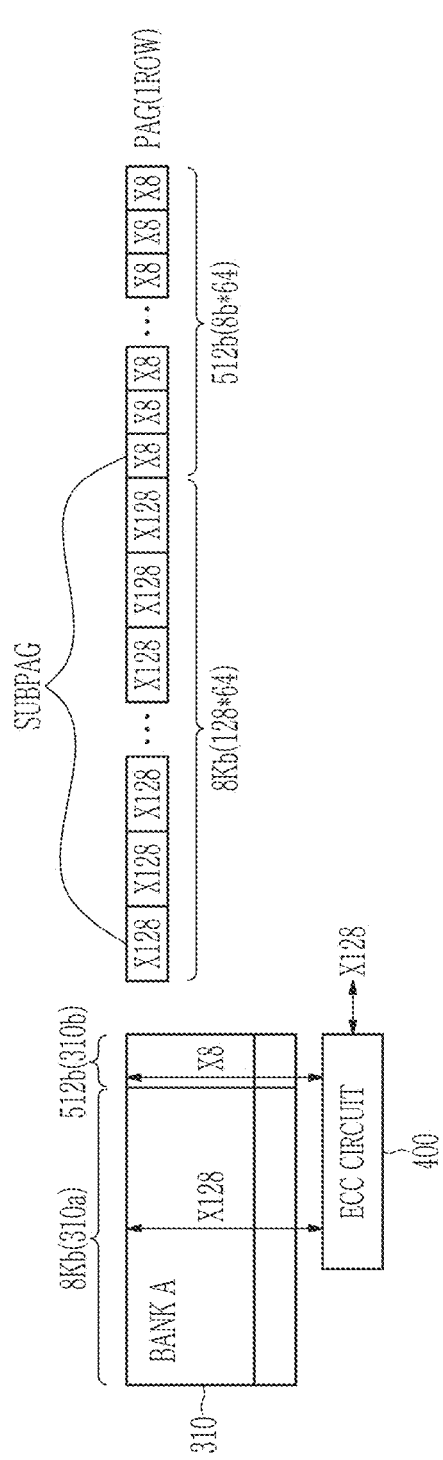
FIG. 5 is a diagram for describing a bank array of a memory cell array and an example ECC circuit.

Each of the plurality of word lines WL may correspond to each of a plurality of rows for the plurality of memory cells MC disposed in each of the first to fourth bank arrays 310 to 340. Additionally, the first to fourth bank arrays 310 to 340 may include a plurality of pages corresponding to the plurality of rows. Referring to FIG. 5 together, depending on the implementation, one row 1ROW among the plurality of rows may correspond to one page PAG among the plurality of pages.

The row decoder 260 may include first to fourth bank row decoders 260a to 260d respectively connected to first to fourth bank arrays 310 to 340. The column decoder 270 may include first to fourth bank column decoders 270a to 270d respectively connected to the first to fourth bank arrays 310 to 340. The sense amplifier 285 may include first to fourth bank sense amplifiers 285a to 285d respectively connected to the first to fourth bank arrays 310 to 340.

The first to fourth bank arrays 310 to 340, the first to fourth bank sense amplifiers 285a to 285d, the first to fourth bank column decoders 270a to 270d, and the first to fourth bank row decoders 260a to 260d may respectively configure the first to fourth banks.

FIG. 3 shows an example of the memory device 200a including four banks, but the number of banks is not limited thereto, and the memory device 200a may include an arbitrary number of banks.

The address register 220 may receive an address ADDR including a bank address BANK_ADDR, a row address ROW_ADDR, and a column address COL_ADDR from the memory controller 100. The address register 220 may provide the received bank address BANK_ADDR to the bank control logic 230, the received row address ROW_ADDR to the row address multiplexer 240, and the received column address COL_ADDR to the column address latch 250.

The bank control logic 230 may generate bank control signals in response to the bank address BANK_ADDR. In response to the bank control signals, the bank row decoder corresponding to the bank address BANK_ADDR among the first to fourth bank row decoders 260a to 260d may be activated, and the bank column decoder corresponding to the bank address BANK_ADDR among the first to fourth bank column decoders 270a-270d may be activated.

The refresh counter 297 may generate a refresh row address REF_ADDR for refreshing the plurality of memory cells MC corresponding to the rows of the memory cell array 300 under the control of the control circuit 210a.

The row address multiplexer 240 may receive a row address ROW_ADDR from the address register 220 and a refresh row address REF_ADDR from the refresh counter 297. The row address multiplexer 240 may selectively output a row address ROW_ADDR or a refresh row address REF_ADDR as a row address RA. The row address RA output from the row address multiplexer 240 may be applied to the first to fourth bank row decoders 260a to 260d, respectively.

Among the first to fourth bank row decoders 260a to 260d, the bank row decoder activated by the bank control logic 230 may decode the row address RA output from the row address multiplexer 240 and activate the word line corresponding to the row address. For example, the activated bank row decoder may apply a word line driving voltage to the word line corresponding to the row address.

Among the first to fourth bank column decoders 270a to 270d, the bank column decoder activated by the bank control logic 230 may activate the sense amplifier corresponding to the bank address BANK_ADDR and the column address COL_ADDR through the input/output gating circuit 290.

The input/output gating circuit 290 may include an input data mask logic, a read data latch for storing data output from the first to fourth bank arrays 310 to 340 and write drivers for writing data to the first to fourth bank arrays 310 to 340, along with the circuits for gating input/output data.

Data to be read from one of the first to fourth bank arrays 310 to 340 may be sensed by a sense amplifier corresponding to the one bank array and stored in the read data latch. The main data MD to be written in one of the first to fourth bank arrays 310 to 340 may be provided from the memory controller 100 to the data input/output buffer 299. The main data MD provided to the data input/output buffer 299 is encoded into a codeword CW in the ECC circuit 400 and provided to the input/output gating circuit 290. The codeword CW may be written to the one bank array through the write drivers.

The data input/output buffer 299 may provide the main data MD provided from the memory controller 100 to the ECC circuit 400 in a write operation and may provide the main data MD provided from the ECC circuit 400 to the memory controller 100 in a read operation.

Depending on the implementation, when the main data MD of a subpage (one unit) includes a correctable error, the control circuit 210a may correct the error and control the ECC circuit 400 to perform a scrubbing operation that rewrites the corrected data to the corresponding subpage.

Depending on the implementation, the control circuit 210a provides a third control signal CTL3 to the ECS circuit 600a, and when the third control signal CTL3 corresponds to the ECS mode, the ECS circuit 600a may be activated and perform a scrubbing operation on the memory cell array 300 through the ECC circuit 400.

During the scrubbing operation, the ECC circuit 400 may output a flag signal Fl including information on whether an error is detected and whether the error is corrected.

The control circuit 210a may generate error information EINF based on the flag signal Fl and provide the error information to the ECS circuit 600a for logging. Depending on the implementation, the error information EINF may include a row address corresponding to a page, a correctable error (CE) count value for the row address, and information about the presence or absence of an uncorrectable error (hereinafter referred to as UE) in the row address, and the like.

Hereinafter, in the present disclosure, 'CE count value' may mean the number of subpages including CE in the page corresponding to the subjected row address. Therefore, when a scrubbing operation is performed on a page corresponding to the subjected row address, the CE count value for the row address on which the scrubbing operation was performed may match the number of subpages for which errors have been corrected in the row address.

For the UE, for example, one subpage may include two or more multi-bit errors.

The control circuit 210a may control the operation of the memory device 200a. For example, the control circuit 210a may generate control signals so that the memory device 200a performs a write operation or a read operation. The control circuit 210a may include a command decoder 211 for decoding a command CMD received from the memory controller 100 and a mode register 212 for setting the operation mode of the memory device 200a.

The control circuit 210a may further include a counter that performs a count operation based on the flag signal Fl from the ECC circuit 400. For example, the counter may count the number of subpages in which errors in the page have been corrected through a flag signal Fl for the subpage. The counter may calculate the CE count value for the row address.

For example, the command decoder 211 may decode a write enable signal /WE, a row address strobe signal /RAS, a column address strobe signal /CAS, a chip selection signal /CS, etc. to generate control signals corresponding to a command CMD. In particular, the control circuit 210a may decode the command CMD to generate a first control signal CTL1 controlling the input/output gating circuit 290, a second control signal CTL2 controlling the ECC circuit 400, and a third control signal CTL3 controlling the ECS circuit 600a.

When a command CMD indicates ECS mode, the control circuit 210a may generate the first control signal CTL1, the second control signal CTL2, and the third control signal CTL3 so that the above-described scrubbing operation of the input/output gating circuit 290 and the ECC circuit 400 and the logging operation of the ECS circuit 600a are performed.

The ECC circuit 400 may generate parity data based on the main data MD provided from the data input/output buffer 299 during a write operation, provide a codeword CW including the main data MD and the parity data to the input/output gating circuit 290. The input/output gating circuit 290 may write the codeword CW to the bank array.

Additionally, the ECC circuit 400 may receive the codeword CW read from one bank array from the input/output gating circuit 290 during a read operation. The ECC circuit 400 may perform decoding of the parity data included in the read codeword CW into the main data MD. Through decoding, it is possible to correct a single bit error included in the main data MD or detect a multi-bit error.

The ECC circuit 400 may sequentially perform ECC decoding on a subpage basis included in a page in the memory cell array 300 in ECS mode. Depending on the implementation, a page in the memory cell array 300 may include a plurality of subpages, and the subpages may include the main data MD and the parity data corresponding thereto. After performing ECC decoding on the data of the subpage, the ECC circuit 400 may provide a flag signal Fl including information about whether an error is detected and whether the error is corrected for the data of the subpage to the control circuit 210a.

The ECS circuit 600a may receive error information EINF from the control circuit 210a and perform a logging operation. The ECS circuit 600a may also log a candidate error row address based on the error information EINF generated through the scrubbing operation described above. The ECS circuit 600a may provide the error information signal EIS for an error row address to the memory controller 100 according to the third control signal CTL3. The ECS circuit 600a may store the error row address corresponding to the transmitted error information signal EIS. The ECS circuit 600a may perform a comparison between the stored error row address and the candidate error row address and log the candidate error row address according to the result of comparison.

Through the transmission of the error information signal EIS in the above-described ECS circuit 600a, storage of the error row address, and a comparison operation with the stored error row address, the memory device 200a may independently manage the error address without intervention of the memory controller 100. Additionally, through the operations in the ECS circuit 600a described above, the memory controller 100 may effectively perform page management.

Figure 4:
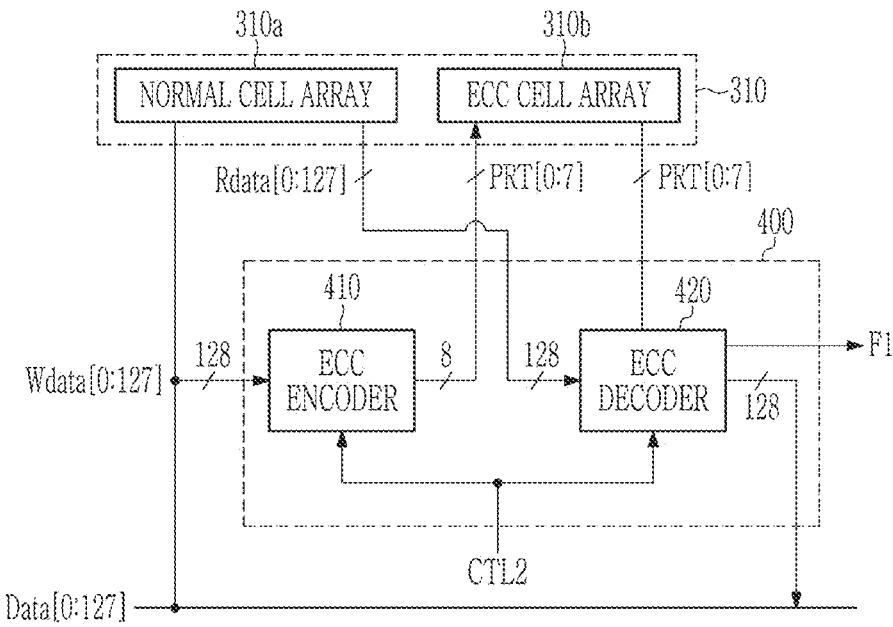
FIG. 4 is a diagram for describing an example ECC circuit.

FIG. 4 is a diagram for describing an ECC circuit. FIG. 5 is a diagram for describing a bank array of a memory cell array and an ECC circuit.

Referring to FIGS. 2 to 5, the ECC circuit 400 may include an ECC encoding circuit 410 and an ECC decoding circuit 420. The ECC encoding circuit 410 may generate parity data PRT[0:7] for the data WData[0:127] to be written to a normal cell array 310a in the first bank array 310 in response to the second control signal CTL2. The generated parity data PRT[0:7] may be stored in an ECC cell array 310b in the first bank array 310.

The normal cell array 310a is a block that determines the memory capacity of the memory device 200a, and the ECC cell array 310b is for ECC, data line repair, and block repair to repair bad cells, which may also be referred to as the EDB block.

Referring to FIG. 5 together, depending on the implementation, one page PAG in the first bank array 310 may have 64 sub-pages SUBPAG. For example, one subpage SUBPAG may include 128 bits of data and 8 bits of parity data, and one subpage SUBPAG may have a data size of 136 bits. The one page PAG may correspond to one row 1ROW in the plurality of memory cells MC of the first bank array 310 and to one word line among the plurality of word lines WL.

Depending on the implementation, 128 bits of data and 8 bits of parity data of the subpage SUBPAG may be sequentially read and provided to the ECC circuit 400.

Depending on the implementation, the ECC encoding circuit 410 may generate the parity data PRT[0:7] for the data WData[0:127] in the memory cell MC including the bad cell in response to the second control signal CTL2. Depending on the implementation, the ECC encoding circuit 410 may store a single parity check code or a single error correction and double error detection (SEC-DED) code.

In response to the second control signal CTL2, the ECC decoding circuit 420 may correct the error bit data using the data RData[0:127] read from the memory cells MC of the normal cell array 310a and the parity data PRT[0:7] read from the ECC cell array 310b to output the error correction data Data[0:127].

Depending on the implementation, the ECC decoding circuit 420 may store a single parity check code or a single error correction and double error detection (SEC-DED) code. For example, the ECC decoding circuit 420 may correct a single bit error or detect two bit errors for the read data RData[0:127] through decoding using the SEC-DED code to detect the UE.

Although not shown, the ECC decoding circuit 420 may generate a syndrome, which includes error location information and an error occurrence signal, etc., by operating based on the read data RData[0:127] and the parity data PRT[0:7]. The ECC decoding circuit 420 may output and provide to the control circuit 210a the flag signal Fl including information about whether an error is detected and whether an error is corrected for the output error correction data Data[0:127] output based on the generated syndrome, the error occurrence signal, and the like.

Although not shown, depending on the implementation, the ECC decoding circuit 420 may directly provide the flag signal Fl to the ECS circuit 600a, and the ECS circuit 600a may perform a logging operation based on the provided flag signal Fl.

Figure 6:
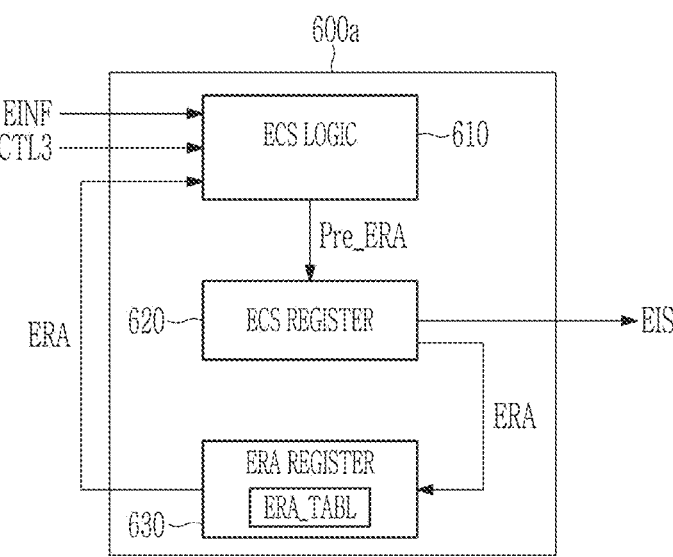
FIG. 6 is a block diagram illustrating an example ECS circuit.

FIG. 6 is a block diagram illustrating an ECS circuit. FIG. 7 is a diagram for describing an ECS register of FIG. 6. FIG. 8 is a diagram for describing an ERA register of FIG. 6.

Referring to FIGS. 3 and 6 to 8, the ECS circuit 600a may include an ECS logic 610, an ECS register 620, and an ERA register 630.

The ECS logic 610 is activated when the third control signal CTL3 corresponds to the ECS mode of the memory device 200a and may perform a scrubbing operation on the memory cell array 300 through the ECC circuit 400.

When the third control signal CTL3 corresponds to a report command for an error row address, the ECS logic 610 may output a candidate error row address Pre_ERA logged in the ECS register 620 as an error row address. The output error row address may be transmitted to the memory controller 200 as the error information signal EIS.

The ECS logic 610 may store an error row address ERA corresponding to the transmitted error information signal EIS in an error row address table ERA_TABL. Depending on the implementation, the error row address table ERA_T-ABL may include a plurality of error row addresses ERA.

The ECS logic 610 may compare the row address included in the received error information EINF with the error row address ERA stored in the error row address table ERA_TABL.

Depending on the implementation, if the stored error row address ERA and the row address included in the received error information EINF are the same, a logging operation may not be performed in the ECS register 620 based on the received error information EINF. Depending on the implementation, if the stored error row address ERA and the row address included in the received error information EINF are different, a logging operation may be performed in the ECS register 620 based on the received error information EINF. Depending on the implementation, the candidate error row address Pre_ERA logged in the ECS register 620 may be different from the error row address ERA stored in the ERA register 630.

Referring to FIG. 8 as an example, if the row address included in the received error information EINF is the same as a plurality of error row addresses RAb, RAd, . . . , RAz stored in the error row address table ERA_TABL, the ECS logic 610 may not perform a logging operation based on the received error information EINF.

Through the comparison operation of the ECS logic 610, the memory device 200a may independently manage the error row address without intervention of the memory controller 100 (FIG. 2).

The ECS logic 610 may log the candidate error row address Pre_ERA and error information about the candidate error row address Pre_ERA in the ECS register 620 based on the received error information EINF.

Referring now to FIG. 7, the ECS logic 610 may log the candidate error row address Pre_ERA, a CE count value CE_COUNT for the candidate error row address Pre_ERA, and the presence or absence of a UE for the candidate error row address Pre_ERA together in ECS register 620.

Depending on the implementation, if the CE count value included in the error information EINF received in the ECS logic 610 is greater than the CE count value for the candidate error row address Pre_ERA stored in the ECS register 620, ECS Logic 610 may newly log a candidate error row address Pre_ERA in the ECS register 620 based on the received error information EINF.

Depending on the implementation, if the row address of the error information EINF received in the ECS logic 610 includes a UE, the ECS logic 610 may newly log a candidate error row address Pre_ERA in the ECS register 620 based on the received error information EINF. For example, if the page of the row address for the received error information EINF includes a UE subpage including the UE, the ECS logic 610 may perform a new logging operation on the ECS register 620.

The ECS register 620 may store the final candidate error row address Pre_ERA detected according to the scrubbing operation through the above-described logging operation. Depending on the implementation, the ECS register 620 may log one candidate error row address Pre_ERA and error information EINF for the one candidate error row address Pre_ERA. For example, according to the DDR5 Specification, one error address is logged for each memory chip. Additionally, according to the HBM3 Specification, one error address is logged for each pseudo channel.

Referring to FIG. 7 as an example, the ECS register 620 may log the y-th row address RAy, a CE count value for the y-th row address RAy is Cy, and information that no UE is included in the y-th row address RAy together. For example, the page corresponding to the y-th row address RAy may include the largest number of subpages with errors corrected among pages scrubbed after receiving the latest report command. That is, the CE count value may be maximum at the y-th row address RAy after receiving the latest report command.

The ERA register 630 may store the error row address table ERA_TABL. Depending on the implementation, the error row address table ERA_TABL may store up to a predetermined number of error row addresses.

Referring to FIG. 8 as an example, the error row address table ERA_TABL may include n lists and store up to n error row addresses, and the error row address table ERA_TABL in FIG. 8 stores n–3 different error row addresses RAb, RAd, . . . , RAz, but is not limited to the above number of examples.

The plurality of error row addresses RAb, RAd, . . . , Raz may be stored in the error row address table ERA_TABL through the transmission of error information signal EIS by the ECS logic 610, the storage of the error row address ERA, the comparison operation between stored error row address ERA and received error information EINF, and the repetition of logging operation for candidate error row address Pre_ERA.

In the drawing, the ECS circuit 600a is shown as being configured as a separate dedicated circuit in the memory device 200a. However, depending on the implementation, the ECS circuit 600a may be one component in the control circuit 210a.

Figure 9:
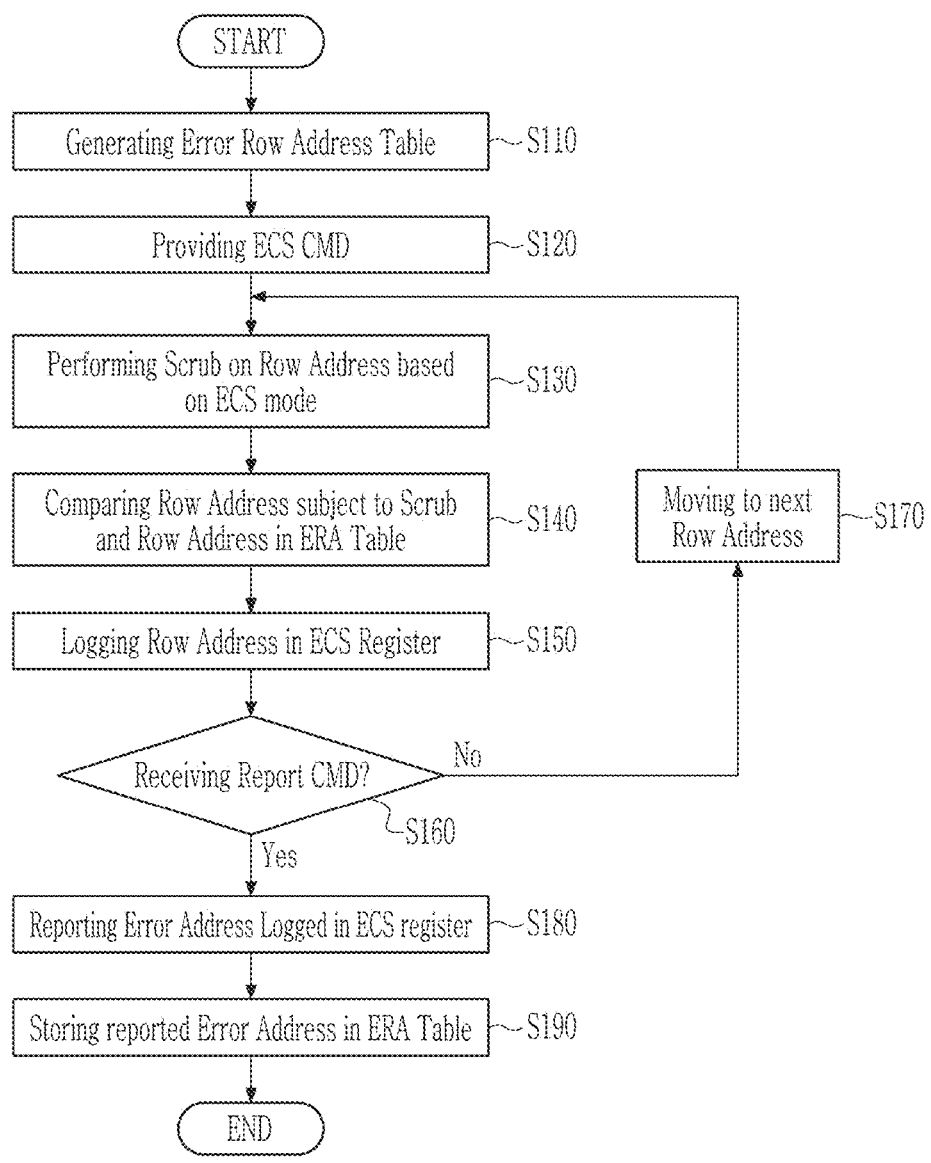
FIG. 9 is a flowchart for describing an example method of operating a memory system.
Figure 10:
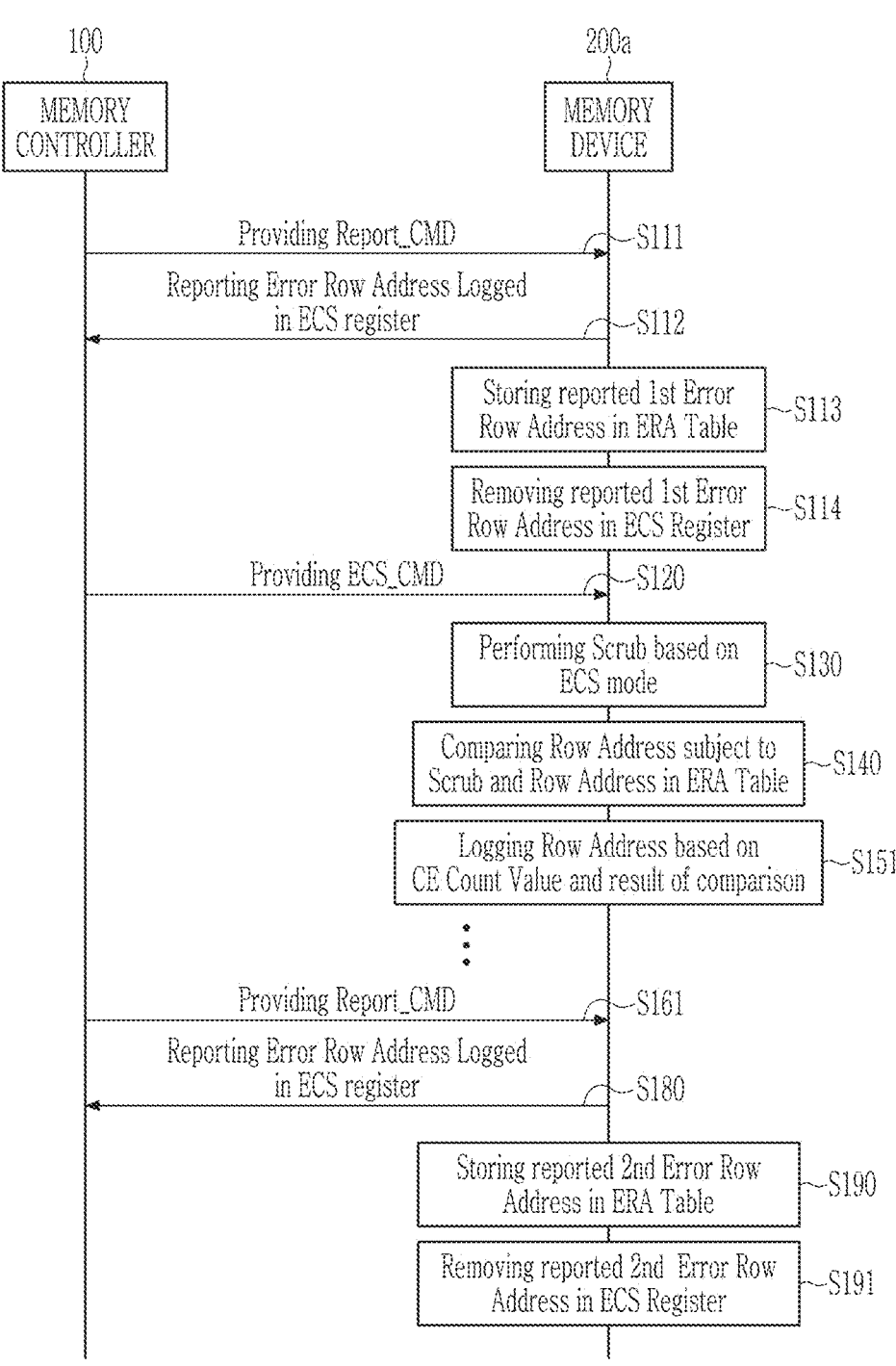
FIG. 10 is a ladder diagram for describing an example method of operating a memory system.
Figure 11:
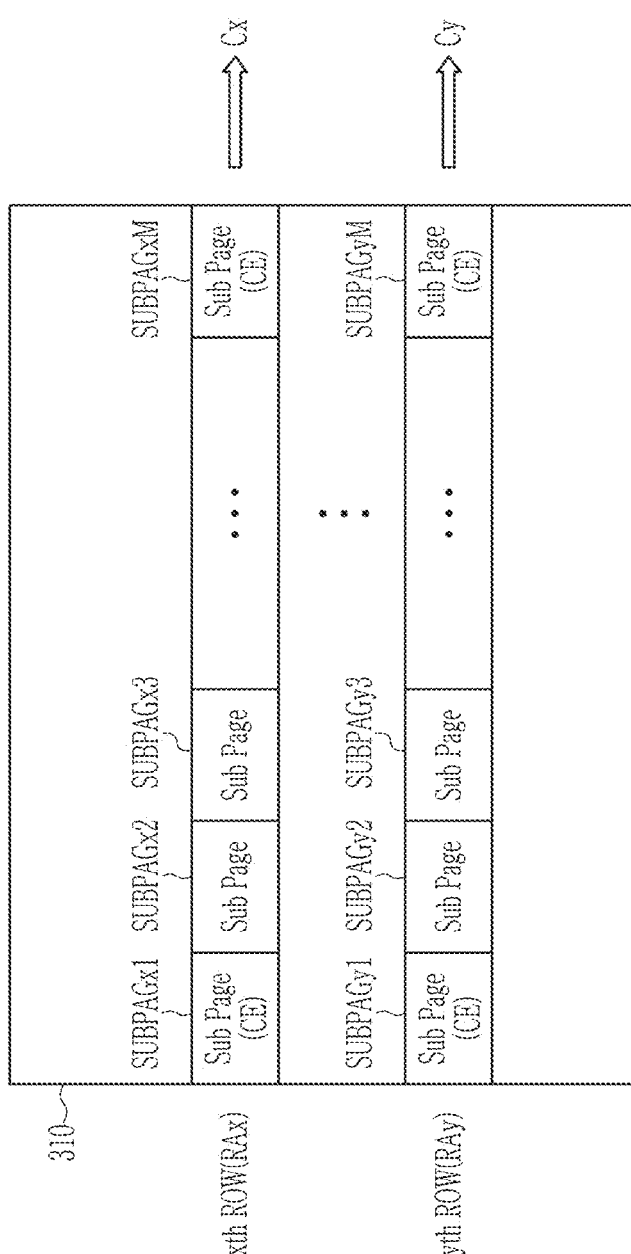

FIG. 9 is a flowchart for describing a method of operating a memory system. FIG. 10 is a ladder diagram for describing a method of operating a memory system. FIGS. 11 to 13 are diagrams for describing a method of operating a memory system.

Referring to FIGS. 3, 6, 9, and 10, the memory device 200a generates an error row address table ERA_TABL based on the report command (S110).

The memory controller 100 may provide a report command requesting a report on an error row address to the memory device 200a (S111). The control circuit 210a of the memory device 200a may output the third control signal CTL3 to control the ECS circuit 600a in response to receiving a report command for the error row address of the memory controller 100.

In response to receiving the report command, the ECS circuit 600a of the memory device 200a may report the candidate error row address Pre_ERA logged in the ECS register 620 as the error row address ERA to the memory controller 100 (S112). A report on the error row address ERA may be provided to the memory controller 100 in the form of an error information signal EIS.

The ECS circuit 600a may store the error row address ERA corresponding to the error information signal EIS in the error row address table ERA_TABL (S113).

The ECS circuit 600a may remove the error row address ERA logged in the ECS register 620 after the report and storage operation for the error row address ERA (S114).

The memory controller 100 may provide a command for the ECS mode to the memory device 200a (S120). The ECS circuit 600a of the memory device 200a may be activated through a command for the ECS mode.

The ECS circuit 600a may perform a scrubbing operation on the page corresponding to the row address in ECS mode (S130). The ECS circuit 600a may perform a scrubbing operation on a subpage basis in a page through the ECC circuit 400.

The ECS logic 610 may compare the row address, subject to the scrubbing operation, and the error row address ERA stored in the error row address table ERA_TABL (S140). The ECS logic 610 may receive the row address, subject to the scrubbing operation through the received error information EINF, and compare the row address, subject to the received scrubbing operation, and the error row address ERA.

The ECS circuit 600a may log the row address of the candidate error row address Pre_ERA in the ECS register 620 according to the result of comparison in step S140 (S150). Depending on the implementation, the ECS circuit 600a may log the candidate error row address Pre_ERA in the ECS register 620 based on the CE count value for the row address and the result of comparison in step S140 (S151).

Depending on the implementation, if the row address subject to the scrubbing operation and the error row address ERA are different, the ECS circuit 600a may compare the CE count value of the candidate error row address Pre_ERA stored in the ECS register 620 and the CE count value for the row address subject to the scrubbing operation received through the error information EINF.

If the row address subject to the scrubbing operation and the error row address ERA are different, and the CE count value for the row address subject to the scrubbing operation received through the error information EINF is greater than the CE count value of the candidate error row address Pre_ERA, the ECS logic 610 may log the row address subject to the scrubbing operation in the ECS register 620.

Depending on the implementation, if there is no row address logged in the ECS register 620, the ECS logic 610 may log the row address subject to the scrubbing operation in the ECS register 620 only by comparing it with the error row address ERA.

Referring additionally to FIGS. 8, 11, and 12, for example, with the x-th row address RAx logged in the ECS register 620 as a candidate error row address Pre_ERA, the ECS logic 610 may perform a scrubbing operation on the y-th row address RAy.

The ECS logic 610 may compare the y-th row address RAy and the error row address ERA of the error row address table ERA_TABL while performing a scrubbing operation on the y-th row address RAy. In addition, if the y-th row address RAy and the error row address ERA are different from each other, the ECS logic 610 may compare Cx, which is the CE count value for the x-th row address RAx logged as the candidate error row address Pre_ERA, and Cy, which is the CE count value for the y-th row address RAy.

Among a plurality of x_1-th to x_M-th subpages SUB-PAGx1 to SUBPAGxM included in the x-th row address RAx, Cx subpages may include a CE. The Cx subpages may be error-corrected during the scrubbing operation. Among the plurality of y_1-th to y_M-th subpages SUBPAGy1 to SUBPAGyM included in the y-th row address RAy, Cy subpages may include a CE. The Cy subpages may be error-corrected during the scrubbing operation. Depending on the implementation, Cy may be greater than Cx.

The ECS logic 610 may log to the ECS register 620 as the candidate error row address Pre_ERA for the y-th row address RAy corresponding to Cy, which is larger than Cx and different from the plurality of the error row addresses RAb, RAd, . . . , RAz stored in the error row address table ERA_TABL.

The ECS logic 610 of the memory device 200a may check whether a report command for an error row address is received from the memory controller 100 (S160). Depending on the implementation, if the ECS logic 610 does not receive the third control signal CTL3 corresponding to the report command, the ECS logic 610 may operate by determining that the report command has not been received.

If the report command is not received, the ECS logic 610 may move to the row address subject to the next scrubbing operation (S170). The move to the target of the scrubbing operation may be performed sequentially by row address, or by a predetermined scheduling method.

Before the next report command is received, the ECS logic 610 may repeatedly perform steps S130 to S170.

The memory controller 100 may provide a report command requesting a report on the error row address to the memory device 200a (S161). The control circuit 210a of the memory device 200a may output the third control signal CTL3 to control the ECS circuit 600a, in response to receiving a report command for the error row address of the memory controller 100.

In response to receiving the report command in step S161, the ECS circuit 600a of the memory device 200a may report the candidate error row address Pre_ERA logged in the ECS register 620 to the memory controller 100 as the error row address ERA (S180).

Referring to FIG. 8, FIG. 11, and FIG. 12 as examples, between steps S120 and S161, the ECS circuit 600a may perform sequential scrubbing operations for the x-th row address RAx to the y-th row address RAy.

If the CE count value for the y-th row address RAy is the maximum among the x-th row address RAx to the y-th row address RAy that are subject to the scrubbing operation, the y-th row address RAy may be finally logged in the ECS register 620 as the candidate error row address Pre_ERA.

The finally logged y-th row address RAy may be provided to the memory controller 100 in the form of an error information signal EIS.

The ECS circuit 600a may store the error row address ERA corresponding to the error information signal EIS in the error row address table ERA_TABL (S190).

Referring additionally to FIG. 13, the ECS circuit 600a may add and store the y-th row address RAy transmitted in the form of an error information signal EIS to the error row address table ERA_TABL. Afterwards, the ECS circuit 600a may remove the error row address ERA logged in the ECS register 620 (S191). For example, the ECS circuit 600a may remove the logged y-th row address RAy from the ECS register 620.

Through the method of operating the memory device 200a as described above, the memory device 200a may prevent the error address from being redundantly transmitted to the memory controller 100. Furthermore, the memory device 200a may independently manage the error row address without separate intervention of the memory controller 100.

Figure 14:
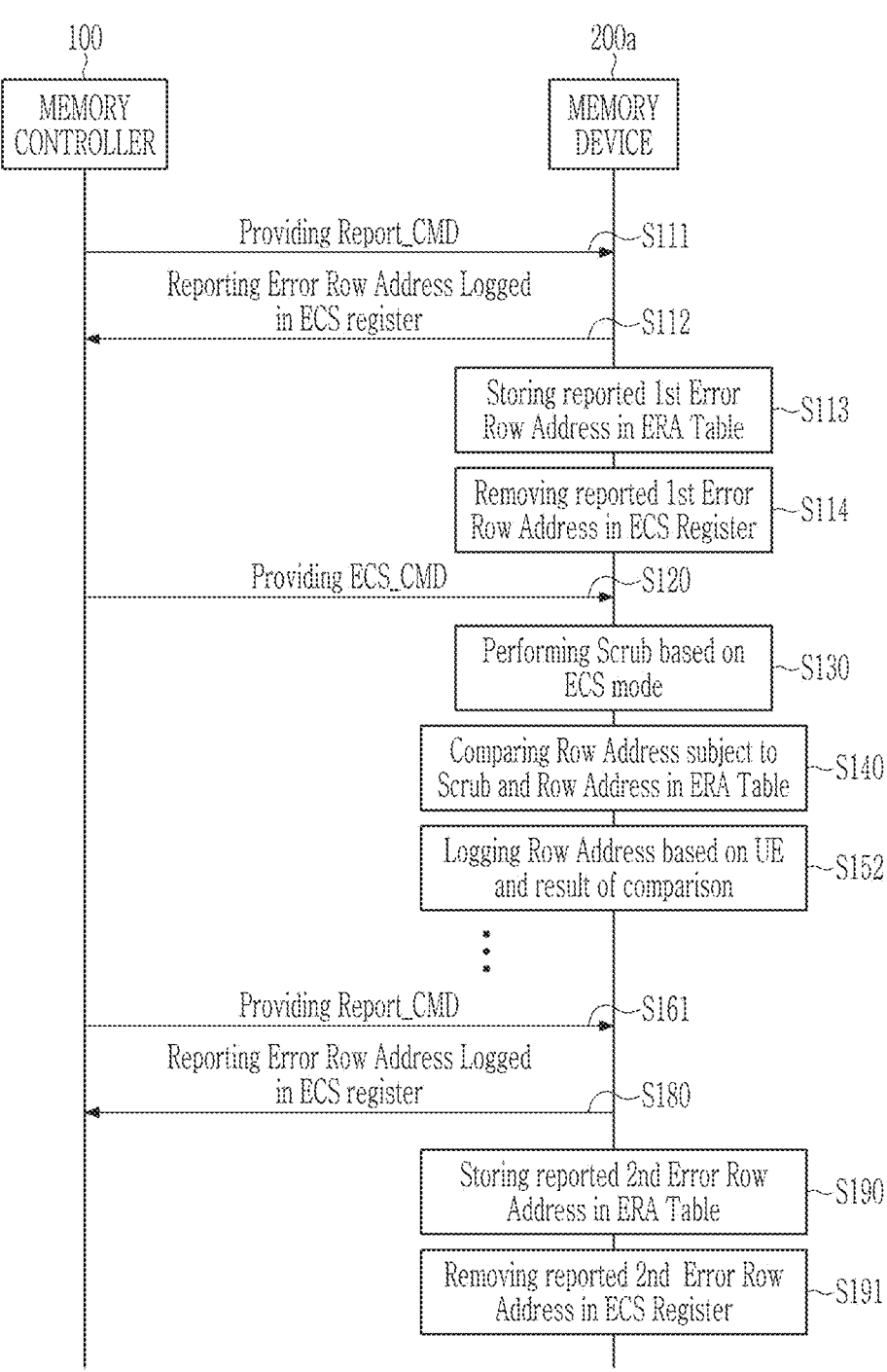
FIG. 14 is a ladder diagram for describing an example method of operating a memory system.
Figure 15:
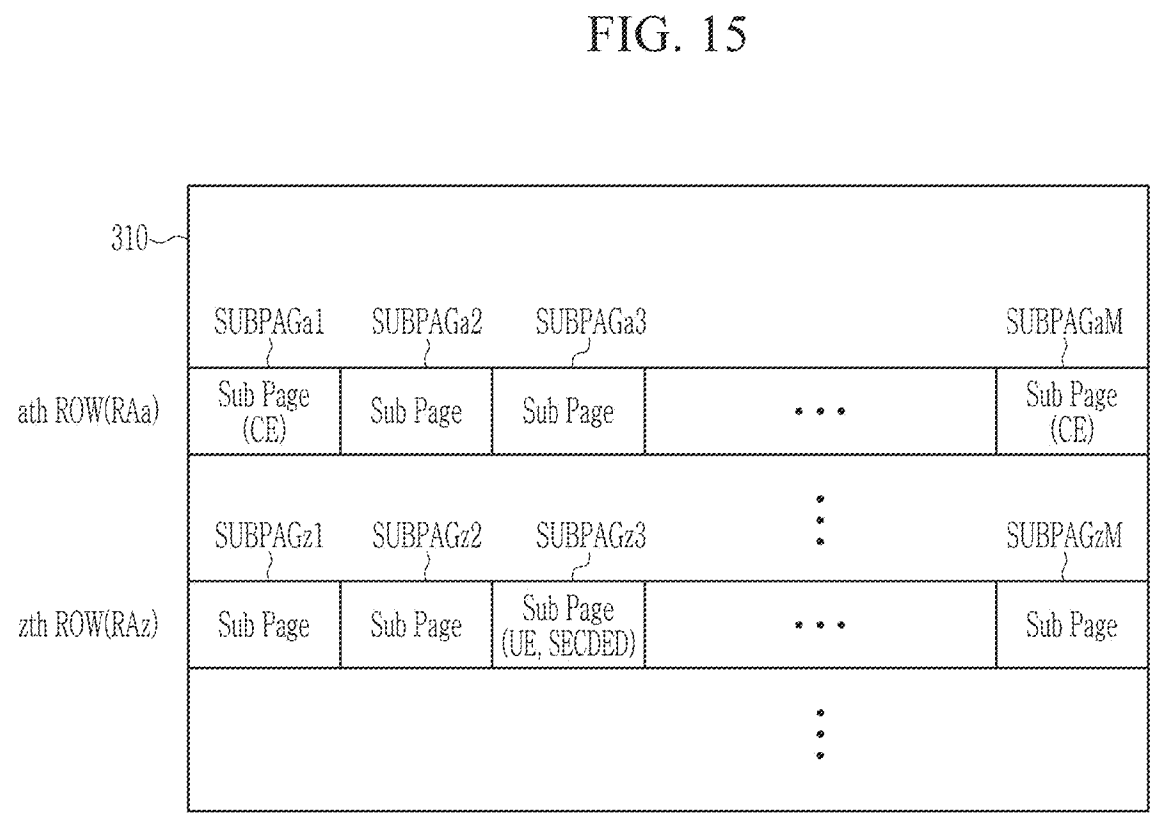

FIG. 14 is a ladder diagram for describing a method of operating a memory system. FIGS. 15 to 17 are diagrams for describing a method of operating a memory system.

FIG. 14 is a ladder diagram for describing another method of operating the memory device 200a. For convenience of description, the following description will focus on differences from the method of operating the memory device 200a in FIG. 10. Descriptions of the omitted steps may be replaced with descriptions of the corresponding steps in FIG. 10.

Referring to FIGS. 9 and 14, the ECS circuit 600$a$ may log the row address of the candidate error row address Pre_ERA in the ECS register 620 according to the result of comparison in step S140 (S150). Depending on the implementation, the ECS circuit 600$a$ may log the candidate error row address Pre_ERA in the ECS register 620 based on whether the row address includes the UE along with the result of comparison in step S140 (S152).

Depending on the implementation, if the row address subject to the scrubbing operation and the error row address ERA are different, the ECS circuit 600$a$ may detect whether the page corresponding to the row address subject to scrubbing operation has a subpage including the UE.

If the row address subject to the scrubbing operation and the error row address ERA are different and the UE is included in the page corresponding to the row address, the ECS logic 610 may preferentially log the row address subject to the scrubbing operation in the ECS register 620.

Depending on the implementation, if there is no row address logged in the ECS register 620, the ECS logic 610 may log the row address subject to the scrubbing operation in the ECS register 620 only by comparing it with the error row address ERA.

Referring additionally to FIGS. 8, 15, and 16, for example, with the a-th row address RAa logged in the ECS register 620 as a candidate error row address Pre_ERA, the ECS logic 610 may perform a scrubbing operation on the z-th row address RAz.

The ECS logic 610 may compare the z-th row address RAz and the error row address ERA of the error row address table ERA_TABL while performing a scrubbing operation on the z-th row address RAz. Additionally, if the z-th row address RAz and the error row address ERA are different from each other, the ECS logic 610 may check whether the z-th row address RAz includes a UE.

Among the plurality of a_1-th to a_M-th subpages SUB-PAGa1 to SUBPAGaM included in the a-th row address RAa, Ca subpages may include CE, and the x-th row address RAx does not include the UE. The Ca subpages may be error-corrected during a scrubbing operation. The z_3-th subpage SUBPAGz3 among a plurality of z_1-th to z_M-th subpages SUBPAGz1 to SUBPAGzM included in the z-th row address RAz may include a UE detected through ECC decoding by SEC-DED code.

However, the ECS logic 610 cannot be logged in the ECS register 620 as the candidate error row address Pre_ERA because the z-th row address RAz matches the plurality of error row addresses RAb, RAd, . . . , RAz stored in the error row address table ERA_TABL.

In another implementation, if the z-th row address RAz is different from a plurality of error row addresses stored in the error row address table ERA_TABL and the z-th row address RAz includes a UE, the z-th row address RAz may be preferentially logged in the ECS register 620 as a candidate error row address Pre_ERA.

Referring additionally to FIG. 17, if the a-th row address RAa is finally logged in the ECS register 620, the a-th row address RAa may be provided to the memory controller 100 in the form of an error information signal EIS. The ECS logic 610 may add and store the a-th row address RAa transmitted in the form of an error information signal EIS to the error row address table ERA_TABL.

Through the method of operating the memory device 200$a$ as described above, it is possible to prevent the same error row address from being repeatedly logged in the ECS register 620 of the memory device 200$a$.

Figure 18:
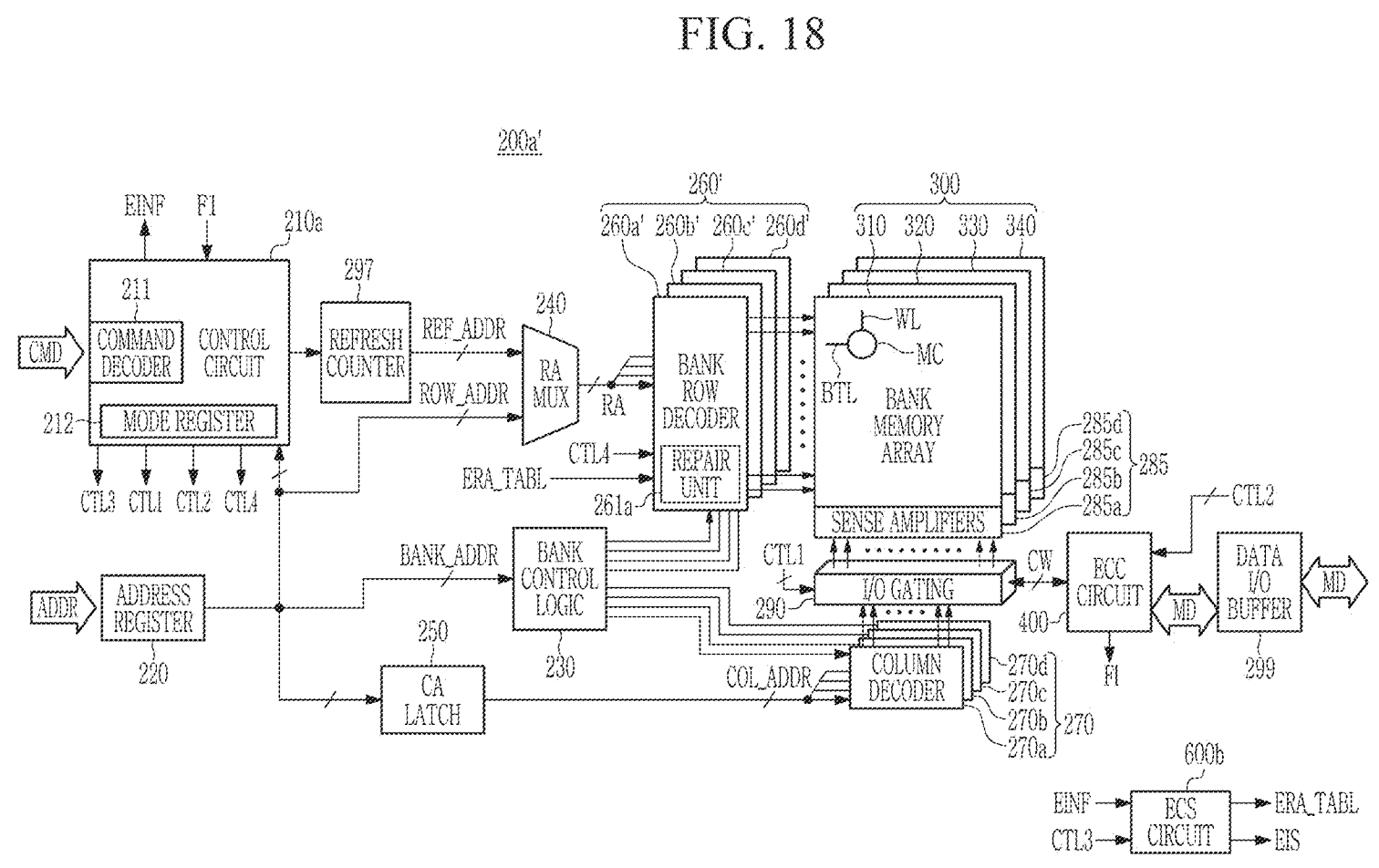

FIG. 18 is a block diagram illustrating configuration of a memory device.

A memory device 200$a'$ of FIG. 18 may correspond to the memory device 200$a$ of FIG. 3. Hereinafter, for convenience of description, the following description will focus on differences from the memory device 200$a$ in FIG. 3. The omitted description in the configuration may be replaced by the description in the memory device 200$a$ in FIG. 3.

Referring to FIG. 18, a row decoder 260' may include a repair unit. Each of first to fourth bank row decoders 260$a'$ to 260$d'$ may include a repair unit, and the first bank row decoder 260$a'$ may include a first repair unit 261$a$.

The first repair unit 261$a$ may perform operations such as wordline repair and block repair to repair defective cells in the first bank array 310.

Depending on the implementation, a fourth control signal CTLA output from the control circuit 210$a$ and the error row address table ERA_TABL output from an ECS circuit 600$b$ may be provided.

When the fourth control signal CTLA corresponds to a command CMD for a repair operation such as hard post package repair hPPR, the first repair unit 261$a$ may perform a repair operation on the word line WL corresponding to the error row address stored in the error row address table ERA_TABL. Depending on the implementation, the word line on which the repair operation was performed may be replaced with a word line arranged in a redundancy cell array.

The memory device 200$a'$ of FIG. 18 may independently perform a repair operation without the need to receive a defective address from the outside, thereby improving the efficiency of the repair operation.

Figure 19:
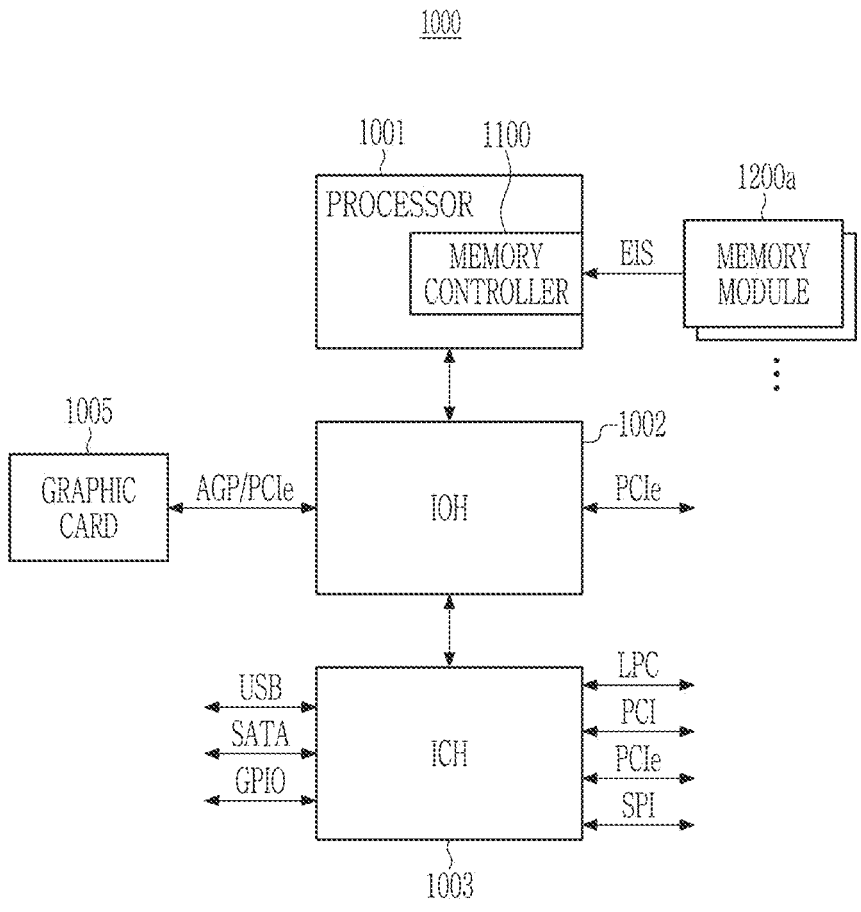
FIG. 19 is a block diagram illustrating a computer device to which an example memory system is applied.

FIG. 19 is a block diagram illustrating a computer device to which a memory system is applied. Referring to FIG. 19, a computer device 1000 includes a processor 1001, an input/output hub 1002, an input/output controller hub 1003, at least one memory module 1200$a$, and a graphic card 1005.

Depending on the implementation, the computer device 1000 may be any computing system, such as a personal computer (PC), a server computer, a workstation, a laptop, a mobile phone, a smart phone, a personal digital assistant (PDA), a portable multimedia player (PMP), a digital camera, a digital television, a set-top box, a music player, a portable game console, navigation system, and the like.

The processor 1001 may perform various computing functions, such as specific calculations or tasks. For example, processor 1001 may be a microprocessor or a central processing unit (CPU). Depending on the implementation, the processor 1001 may include one processor core (single core) or a plurality of processor cores (multi-core). For example, the processor 1001 may include multi-core, such as dual-core, quad-core, or hexa-core. Additionally, although FIG. 19 shows the computer device 1000 including one processor 1001, depending on the implementation, the computer device 1000 may include a plurality of processors. Additionally, depending on the implementation, the processor 1001 may further include a cache memory located internally or externally.

The processor 1001 may include a memory controller 1100 that controls the operation of the memory module 1200$a$. The memory controller 1100 included in the processor 1001 may be referred to as an integrated memory controller (IMC). The memory interface between the memory controller 1100 and the memory module 1200$a$ may be implemented as one channel including a plurality of signal lines or may be implemented as a plurality of channels. Additionally, one or more memory modules 1200a may be connected to each channel. Depending on the implementation, the memory controller 1100 may be located in the input/output hub 1002. The input/output hub 1002 including the memory controller 1100 may be referred to as a memory controller hub (MCH).

The memory module 1200a may include memory devices that store data provided from the memory controller 1100. As described with reference to FIGS. 1 to 18, each of the memory devices may perform the above-described ECS scrubbing operation, a transmission operation for the error information signal EIS, and the storage operation for the error row address corresponding to the error information signal EIS, including a control circuit, an ECC circuit, and an ECS circuit.

Through the ECS scrubbing operation, a transmission operation for the error information signal EIS, and the storage operation for the error row address corresponding to the error information signal EIS, the memory module 1200a may prevent the error row address from being redundantly transmitted to the memory controller 1100. Furthermore, the memory device 1200a may independently manage the error row address without separate intervention of the memory controller 100.

The input/output hub 1002 may manage data transmission between the processor 1001 and devices such as the graphic card 1005. The input/output hub 1002 may be connected to the processor 1001 through various interfaces. For example, the input/output hub 1002 and the processor 1001 may be connected via various standard interfaces such as front side bus (FSB), system bus, hypertransport, lightning data transport (LDT), quickpath interconnect (QPI), common system interface (CSI), and the like.

Although FIG. 19 shows the computer device 1000 including one input/output hub 1002, depending on the implementation, the computer device 1000 may include a plurality of input/output hubs.

The input/output hub 1002 may provide various interfaces with devices. For example, the input/output hub 1002 may provide an accelerated graphics port (AGP) interface, a peripheral component interface-express (PCIe) interface, communications streaming architecture (CSA) interface, and the like.

The graphic card 1005 may be connected to the input/output hub 1002 through AGP or PCIe. The graphic card 1005 may control a display device for displaying images. The graphic card 1005 may include an internal processor and an internal memory device for image data processing. Depending on the implementation, the input/output hub 1002 may include a graphic device with the graphic card 1005 located outside of the input/output hub 1002, or inside the input/output hub 1002 instead of the graphic card 1005. The graphic device included in the input/output hub 1002 may be referred to as integrated graphics. Additionally, the input/output hub 1002 including a memory controller and a graphic device may be referred to as a graphics and memory controller hub (GMCH).

The input/output controller hub 1003 may perform data buffering and interface arbitration so that various system interfaces operate efficiently. The input/output controller hub 1003 may be connected to the input/output hub 1002 through an internal bus. For example, the input/output hub 1002 and the input/output controller hub 1003 may be connected through a direct media interface (DMI), a hub interface, an enterprise southbridge interface (ESI), PCIe, and the like.

The input/output controller hub 1003 may provide various interfaces with peripheral devices. For example, the input/output controller hub 1003 may provide a universal serial bus (USB) port, a serial advanced technology attachment (SATA) port, a general purpose input/output (GPIO), a low pin count (LPC) bus, a serial peripheral interface (SPI), PCI, PCIe, and the like.

Depending on the implementation, the processor 1001, the input/output hub 1002, and the input/output controller hub 1003 may be implemented as separate chipsets or integrated circuits, or two or more constituent elements among the processor 1001, the input/output hub 1002, or the input/output controller hub 1003 may be implemented as a single chipset.

Figure 20:
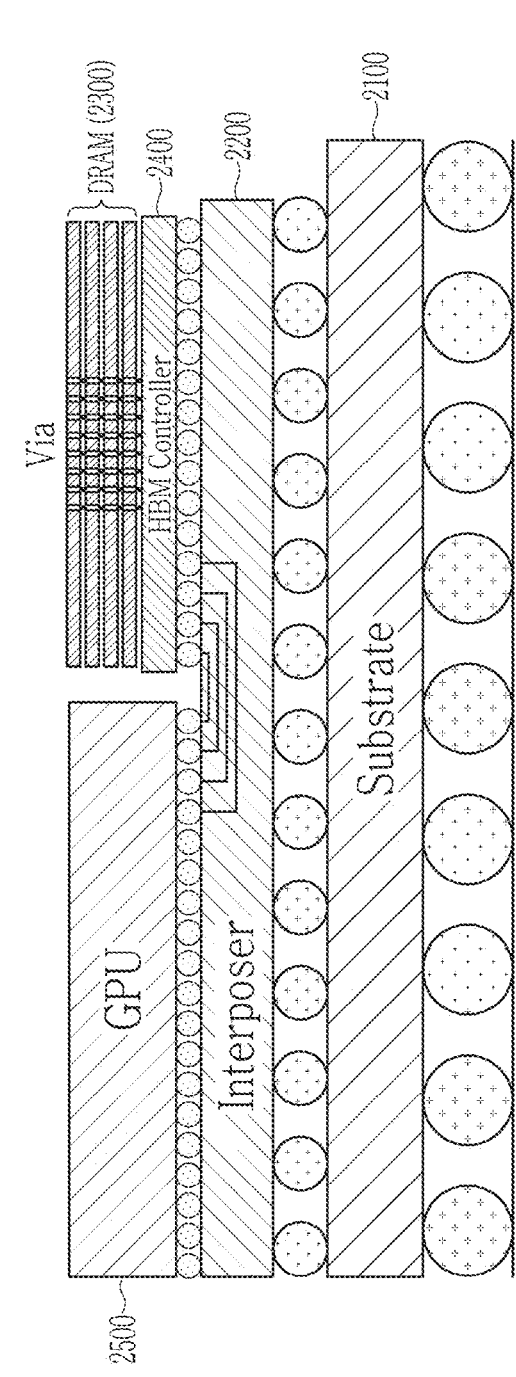
FIG. 20 is a diagram for describing a graphic card system to which an example memory system is applied.

FIG. 20 is a diagram for describing a graphic card system to which a memory system is applied. Referring to FIG. 20, in a graphics card system 2000, a GPU 2500 and a stacked DRAM 2300 may be connected onto a package substrate 2100 through an interposer 2200. The DRAM 2300 may be connected onto a HBM controller 2400 through TSV (Via). The HBM controller 2400 may be connected to the GPU 2500 through the interposer 2200.

Each of the DRAM 2300 and the HBM controller 2400 may perform the ECS scrubbing operation, the transmission operation for an error information signal, and a storage operation for the error row address corresponding to the error information signal, as described in FIGS. 1 to 18. Depending on the implementation, the HBM controller 2400 may include a control circuit, an ECC circuit, and an ECS circuit.

Through the ECS scrubbing operation, a transmission operation for the error information signal, and the storage operation for the error row address corresponding to the error information signal, the HBM controller 2400 may prevent the error row address of the DRAM 2300 from being redundantly transmitted to the GPU 2500. Furthermore, the HBM controller 2400 may independently manage the error row address of the DRAM 2300, without the separate intervention of the GPU 2500.

Figure 21:
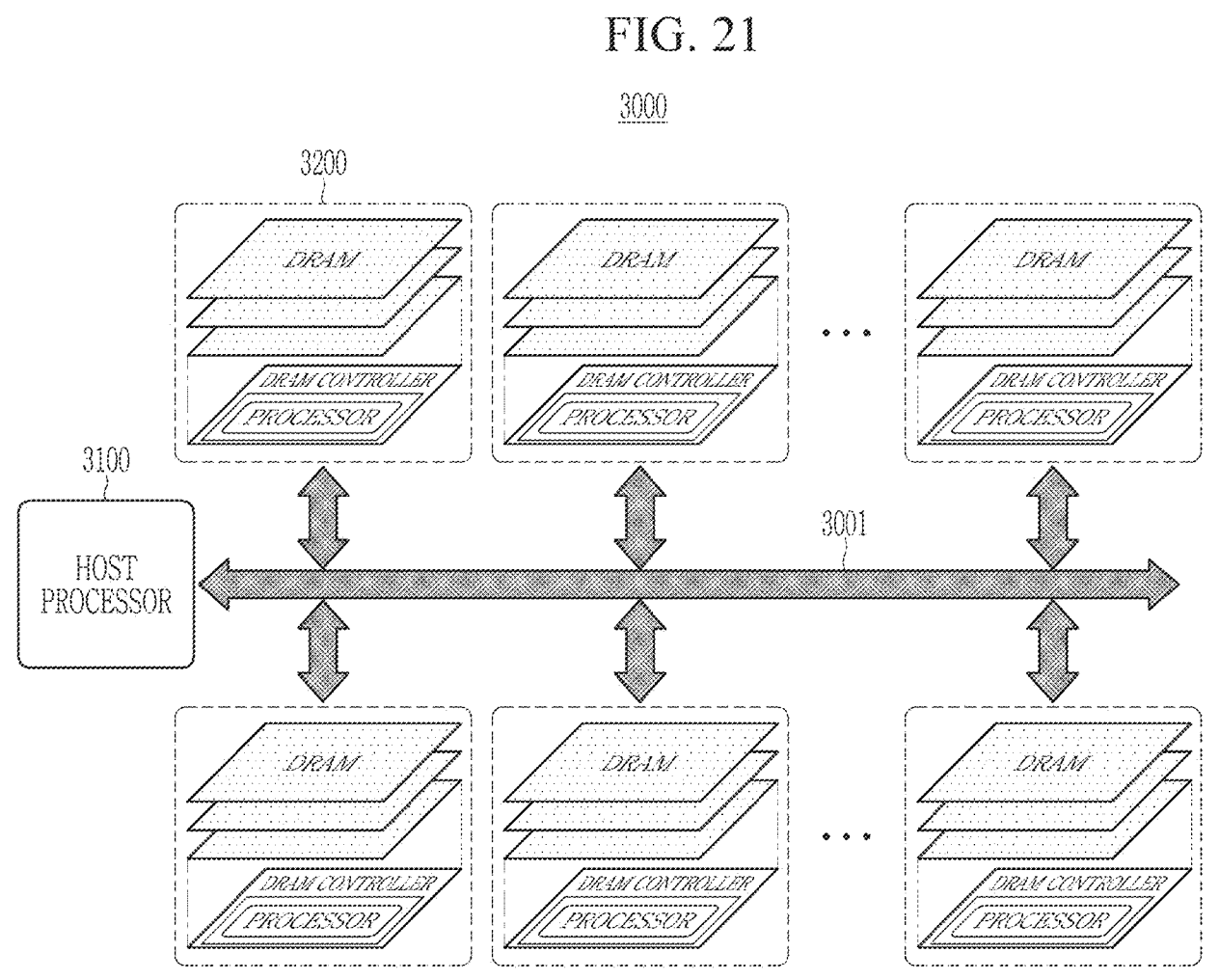

FIG. 21 is a diagram for describing a computing system to which a memory system is applied. Referring to FIG. 21, a computing system 3000 may include a host processor 3100 and at least one memory package chip 3200 controlled by the host processor 3100. Depending on the implementation, the host processor 3100 and the memory package chip 3200 may transmit and receive data through a channel 3001.

The memory package chip 3200 may include stacked memory chips and a controller chip. As shown in FIG. 21, the memory package chip 3200 may include a plurality of DRAM memory chips formed on a DRAM controller chip. As described in FIGS. 1 to 18, between the memory chips of the memory package chip 3200 and the controller chip, an ECS scrubbing operation, a transmission operation for an error information signal, and a storage operation for the error row address corresponding to the error information signal may be performed. The memory package chip 3200 may independently manage error row addresses of memory chips without separate intervention.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the implementations of the present disclosure have been described in detail, it is to be understood that the disclosure is not limited to the disclosed implementations, but on the contrary, is intended to cover various modifications and equivalent arrangements included within the spirit and scope of the appended claims.

What is claimed is:

1. A memory device, comprising:
a memory cell array including a plurality of memory cells configured to store data;
an error correction code (ECC) circuit configured to read the data from the memory cell array and correct errors in the data; and
an error check and scrub (ECS) circuit configured to:
perform a scrubbing operation on the memory cell array in an ECS mode,
transmit a signal for an error address detected based on the scrubbing operation to a memory controller, and
store the error address transmitted to the memory controller,
wherein the ECS circuit comprises:
a first register in which a first row address for the error address is logged; and
a second register in which the error address transmitted to the memory controller is stored, wherein the second register includes an error row address table in which the error address transmitted to the memory controller is stored,
wherein the ECS circuit is further configured to:
compare the first row address with the error row address table; and
log the first row address according to a result of comparing the first row address.

2. The memory device of claim 1, wherein:
the ECS circuit is further configured to remove the first row address from the first register after the error address is transmitted to the memory controller.

3. The memory device of claim 2, wherein:
the ECS circuit is further configured to log a second row address in the first register after the error address is transmitted to the memory controller.

4. The memory device of claim 3, wherein:
the second row address and the error address stored in the second register are different from each other.

5. The memory device of claim 1, wherein:
the first register is configured to store together a first count value, which is a number of subpages including a correctable error (CE) in the first row address, and the first row address.

6. The memory device of claim 5, wherein:
the ECS circuit is configured to perform a scrubbing operation on a second row address, which is different from the first row address, before transmission of the error address to the memory controller,
the first count value is greater than a second count value, which is a number of subpages including CE in the second row address.

7. The memory device of claim 1, wherein:
the first row address comprises a UE subpage including an uncorrectable error (UE).

8. The memory device of claim 7, wherein:
the ECC circuit is configured to detect the UE subpage through a single error correction and double error detection (SEC-DED) code.

9. The memory device of claim 1, wherein:
the ECS circuit is configured to transmit the first row address, which is logged in the first register, as the error address in response to a report command received from the memory controller.

10. The memory device of claim 9, wherein:
the report command is a mode register read (MRR) command.

11. A method of operating a memory device comprising an error check and scrub (ECS) circuit, comprising:
receiving a first report command;
transmitting, by the ECS circuit, a candidate row address logged in a first register of the ECS circuit to a memory controller in response to receiving the first report command;
storing, by the ECS circuit, the transmitted candidate row address in an error row address table that is stored within a second register of the ECS circuit;
performing, by the ECS circuit, a scrubbing operation in an ECS mode on a first row address among row addresses of a memory cell array;
comparing, by the ECS circuit, the first row address with the error row address table; and
logging, by the ECS circuit, the first row address according to a result of comparing the first row address.

12. The method of operating the memory device of claim 11, further comprising:
generating the error row address table; and
removing the row address from the first register.

13. The method of operating the memory device of claim 11, wherein:
the first row address is logged to the first register based on an error address in the error row address table being different from the first row address.

14. The method of operating the memory device of claim 13, wherein:
the first row address includes a subpage including a UE.

15. The method of operating the memory device of claim 13, further comprising:
performing a scrubbing operation in the ECS mode on a second row address which is different from the first row address;
comparing the second row address with the error row address table; and
based on the second row address being different from the error address in the error row address table and based on a first count value being smaller than a second count value, logging the second row address to the first register, wherein the first count value is a number of subpages including CE in the first row address, and wherein the second count value is a number of subpages including CE in the second row address.

16. The method of operating the memory device of claim 11, further comprising:
receiving a second report command after the first report command;
transmitting the logged first row address to a memory controller in response to the second report command; and
storing the transmitted first row address in the error row address table.

17. A memory device, comprising:

a memory cell array including a plurality of memory cells disposed at intersections of a plurality of word lines and a plurality of bit lines;

an ECC circuit configured to read data from the memory cell array and configured to correct errors in the data; and an ECS circuit configured to:

perform a scrubbing operation on the memory cell array in an ECS mode, transmit a signal for an error address detected based on the scrubbing operation to a memory controller, store the error address transmitted to the memory controller inside the ECS circuit; and a row decoder including a repair unit configured to perform a repair operation on the plurality of word lines based on the error address transmitted to the memory controller, wherein the ECS circuit comprises:

a first register in which a first row address for the error address is logged; and a second register in which the error address transmitted to the memory controller is stored, wherein the second register includes an error row address table in which the error address transmitted to the memory controller is stored, wherein the ECS circuit is further configured to:

compare the first row address with the error row address table; and log the first row address according to a result of comparing the first row address.

* * * * *